Patented Nov. 11, 1952

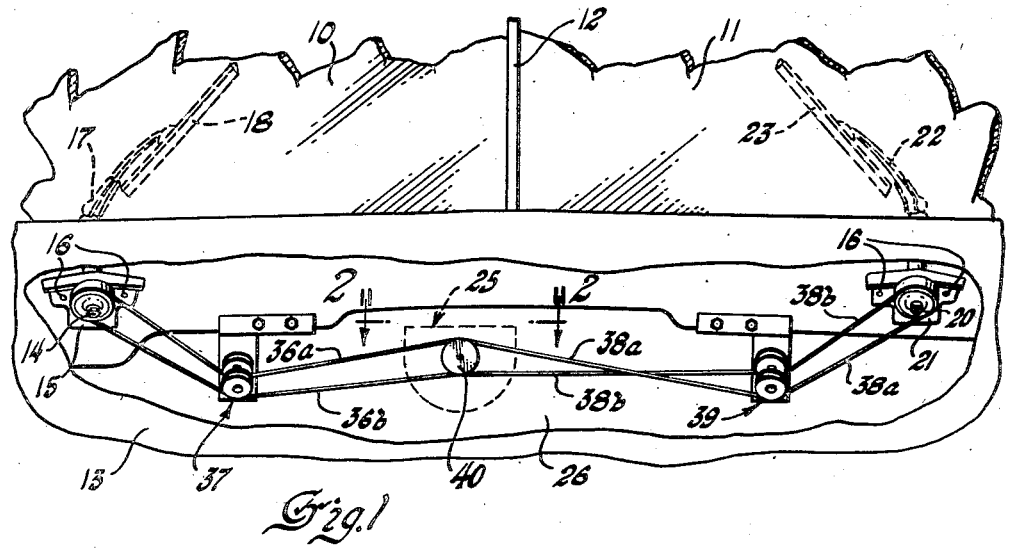

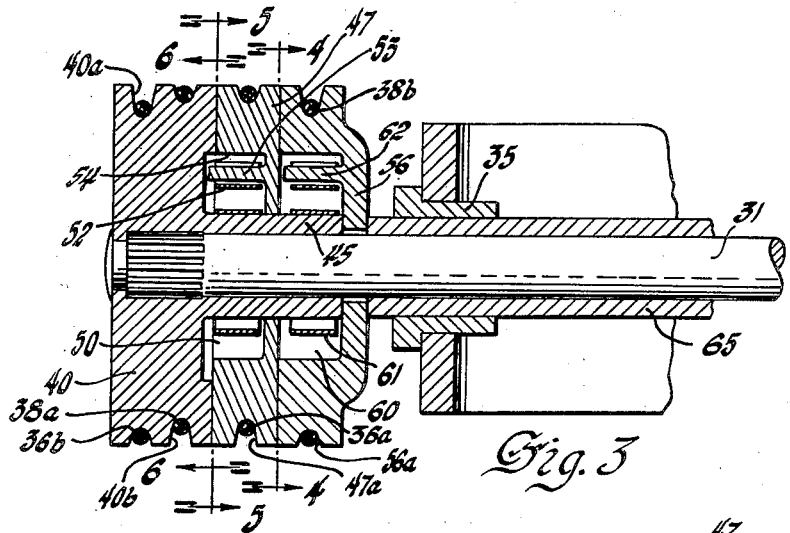
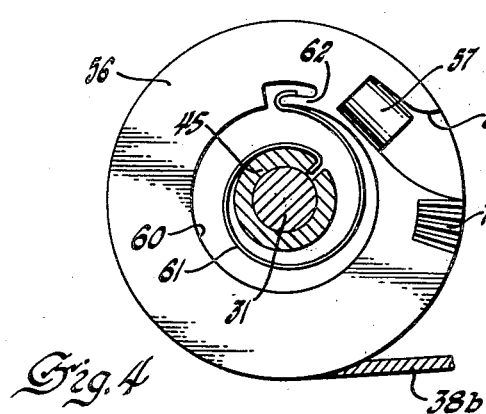
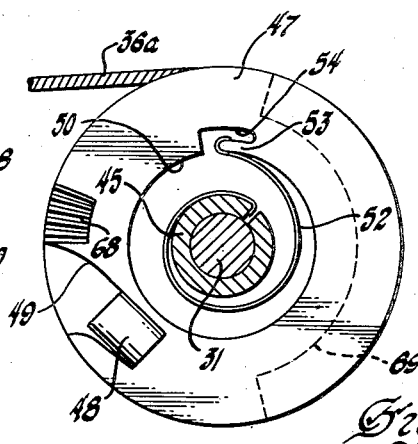
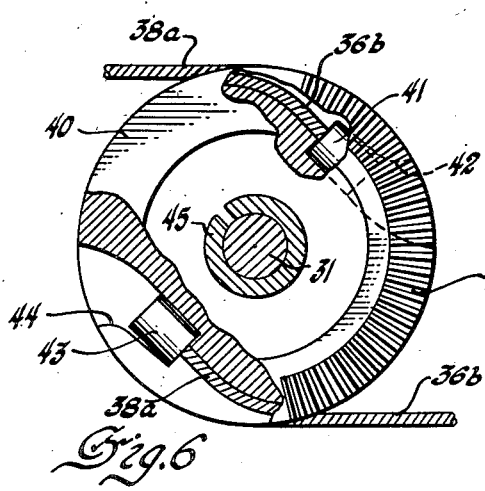
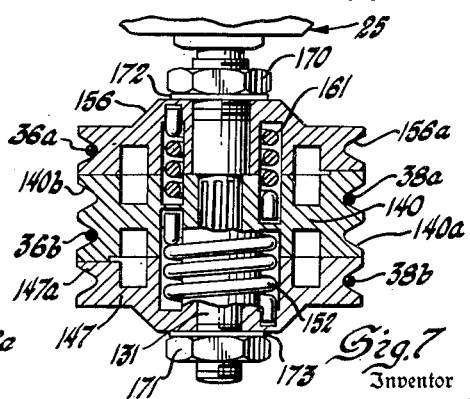

2,617,315

UNITED STATES PATENT OFFICE 2,617,315

WINDSHIELD WIPER DRIVE APPARATUS

Clarence P. McClelland, Royal Oak, Mich., assignor to General Motors Corporation, Detroit, Mich., a corporation of Delaware Application June 29, 1951, Serial No. 234,241

11 Claims. (Cl. 74—722)

This invention relates to windshield wiper drive apparatus, and more particularly to improved operating means on the wiper motor drive shaft.

One feature of the invention is that it provides improved windshield wiper drive apparatus; another feature of the invention is that it provides drive apparatus comprising a plurality of pulleys mounted on the windshield wiper motor drive shaft; a further feature of the invention is that spring means are provided interconnecting certain of said pulleys for causing relative rotation therebetween to tighten the windshield wiper cables; and yet another feature of the invention is that readily releasable means are provided for locking the pulleys to the drive shaft to hold the cables taut.

Other features and advantages of the invention will be apparent from the following description and from the drawings, in which:

Fig. 1 is a fragmentary elevational view of a portion of the dash panel and windshield of an automobile, parts being broken away to show the improved windshield wiper drive apparatus; Fig. 2 is an enlarged fragmentary section taken along the line 2—2 of Fig. 1; Fig. 3 is a further enlarged fragmentary section taken along the line 3—3 of Fig. 2; Fig. 4 is a transverse section taken along the line 4—4 of Fig. 3; Fig. 5 is a transverse section taken along the line 5—5 of Fig. 3; Fig. 6 is a transverse section, partly broken away, taken along the line 6—6 of Fig. 3, and looking in a direction opposite to that of Fig. 5; and Fig. 7 is a fragmentary section through a modified form of apparatus incorporating the invention.

In an automobile a windshield wiper is usually provided at each side of the vertical center line of the windshield, one wiper being in front of the driver's seat and the other wiper being in front of the passenger's seat. Both of these wipers usually are operated by means of a single motor positioned forwardly of the fire wall adjacent the longitudinal center line of the automobile, said motor having a drive shaft which projects rearwardly through the fire wall and which is connected by means of flexible cables to left and right output shafts upon which the respective wipers are mounted, the cables extending between the drive shaft and the respective output shafts.

The flexible cables are conventionally secured to the respective output shafts by means of pulleys mounted on the output shafts, and the cables in the past have usually been secured to the primary or motor drive shaft by means of arms extending radially from the drive shaft. In order to operate the wipers the drive shaft is rocked or oscillated by the motor, the flexible cables transmitting this oscillatory motion to the respective output shafts for operating the wipers. In this type of construction the flexible cables move bodily in directions transverse of their length as the rocker arms oscillate about the axis of the drive shaft. This transverse movement of the cables made it necessary, particularly near the longitudinal center of the automobile where the cables connect with the ends of the rocker arms, to provide free space to accommodate the movement, thus limiting the remaining space available for other elements such as the radio, glove compartment, etc.

According to the present invention the cables are affixed to pulleys on the drive shaft, and the only movement of the cables is in directions longitudinal thereof. Since the cables do not move bodily in directions transverse of their length, it is not necessary to provide any free space adjacent the cables, and the space available for other elements is increased.

In order to install the cables and other windshield wiper operating apparatus it is desirable that the cables have some play so that the parts may be properly positioned. However, once the apparatus is installed it is necessary that the cables be taut in order that power from the motor may efficiently be transmitted to the wiper operating shafts.

In my co-pending application for Windshield Wiper Drive Apparatus, filed November 17, 1950, as S. N. 196,268, I disclosed improved cable tensioning apparatus comprising pulleys mounted on the output shaft, spring means interconnecting said pulleys for causing relative rotation therebetween to tighten the cables, together with readily releasable means for locking the pulleys against relative rotation. The present invention comprises an improved structure in which pulleys are mounted on the drive shaft and are arranged for relative rotation with spring means provided to cause such relative rotation whereby the cables may be tightened, and readily releasable means are provided for locking the pulleys on the drive shaft against relative rotation. According to the present invention the windshield wiper drive apparatus may be installed with the cable slack and the cables for both wipers may be tightened by a single operation. If, after a period of service, the cables for any reason become slack, a single operation will again tighten the cables for both wipers.

Referring now more particularly to the embodiment shown in Figs. 1–6 of the drawings, the improved windshield wiper drive apparatus is illustrated as being installed in a vehicle having a two-part windshield including glass panels 10 and 11 separated by a center partition 12. The windshield is positioned above a dash panel 13, part of which is broken away in Fig. 1 in order better to illustrate the windshield wiper drive apparatus. Each panel of the windshield is provided with a separate wiper.

On the driver's side of the windshield an output shaft 14 is mounted in a bearing and support plate 15 which is secured by bolts 16 to the vehicle body. The shaft 14 extends outside the body and has an arm 17 mounted on the end thereof, and a windshield wiper blade 18 is mounted on the arm 17 in conventional manner. The construction on the passenger's side is similar, a shaft 20 being mounted by means of a plate 21 and carrying at its outer end an arm 22 upon which is mounted a windshield wiper blade 23.

A windshield wiper motor 25, which may be of the conventional oscillating type, is mounted near the transverse center of the vehicle on the fire wall 26 by means of a bracket 27 which is bolted to the fire wall. The bracket 27 has a central aperture aligned with the motor shaft 28, and bearing support brackets 29 and 30 are provided to oscillatably support a primary drive shaft 31. The motor shaft 28 carries at its rear end a block 32 forming one part of a universal connection, the other part comprising a U-shaped member 33 mounted on the forward end of the primary drive shaft 31 with its parallel arms adjacent opposite sides of the block 32 to provide a simple universal type drive. Bushings 34 and 35 support the shaft 31 for oscillation in the brackets 29 and 30.

Coupling is made between the primary drive shaft 31 and the output shaft 14 by means of a first pair of cables 36a and 36b, these cables passing over idler pulleys designated generally at 37. Similarly, coupling is made between the primary drive shaft 31 and the second output shaft 20 by means of a second pair of cables 38a and 38b which pass over idler pulleys designated generally at 39. The cables 38a and 38b are crossed to operate the wipers 18 and 23 in opposite directions. If desired the idler pulleys can be dispensed with and the cables may run directly from the primary drive shaft 31 to the respective output shafts 14 and 20.

According to the present invention, the conventional rocker arms on the drive shaft 31 are dispensed with, and the flexible cables are connected to the drive shaft by means of pulleys mounted on the shaft as hereinafter described. As pointed out earlier, this construction eliminates movement of the cables in directions transverse to their length, thereby minimizing their necessary space for the cables; and the construction may also provide an improved cable tensioning means whereby the cables for both wipers may be tensioned by a single operation.

According to the present invention a first pulley 40 is fixedly mounted on the shaft 31, preferably being splined to the shaft as illustrated in Fig. 3, and having an elongated hub 45 upon which are rotatably mounted a second pulley 47 and a third pulley 56. Pulley 40 is a double pulley, having an outer peripheral groove 40a and an inner peripheral groove 40b. One of the cables of one pair, as the cable 36b, is carried in the outer peripheral groove 40a of the pulley 40, this cable being fastened at its end to an abutment member 41 which is carried in a well 42 in the periphery of the pulley 40. One cable of the other pair, as the cable 38a, is carried in the inner peripheral groove 40b and is fastened at its end to an abutment member 43 carried in a well 44 in the periphery of pulley 40.

The second pulley 47 has a peripheral groove 47a in which is carried the cable 36a, said cable being fastened at its end to an abutment member 48 which is carried in a well 49 in the periphery of the pulley 47. The pulley 47 is provided in one face with a recess 50 which forms a chamber (as shown in Fig. 3) when the pulley 47 is positioned adjacent the pulley 40. A spiral spring 52 is positioned in this chamber, the inner end of the spring being secured to the hub 45 of the pulley 40 and the outer end of the spring being secured to a lug 53 formed by an L-shaped groove 54 in the peripheral wall of the recess 50.

The third pulley 56 is similar in construction to the pulley 47, and has a peripheral groove 56a in which the cable 38b is carried, said cable being fastened at its end to an abutment member 57, carried in a well 58. Pulley 56 is provided in one face with a recess 60 which forms a chamber when pulley 56 is mounted adjacent pulley 47, and a spiral spring 61 is mounted in the chamber, the outer end of the spring being secured to a lug 62 and the inner end of the spring being secured to the hub 45. In order to lock the pulleys 40, 47 and 56 against relative rotation a pressure member 65 is slidably mounted on the shaft 31, this pressure member abutting at one end against the inner face of pulley 56 as shown best in Fig. 3, and the other end of the pressure member abutting a nut 66 (Fig. 2) which is threaded onto the shaft 31. A spring 67 and washer 67a provide a seal where the pressure member 65 extends through the bracket 27.

In order to insure locking against relative rotation, pulley 40 is provided with a serrated area 68a which mates with a complementary serrated area 68 on pulley 47, and pulley 47 is provided on its other face with a serrated area 69 which mates with a complementary serrated area 70 on the adjacent face of pulley 56.

In the operation of the device, the pulleys 47 and 56 are rotated in opposite directions in order to wind the respective springs 52 and 61 and to lengthen the respective cables 36a and 38b. With the parts in this position the nut 66 is tightened to lock the pulleys against relative rotation, and the drive apparatus is installed in the vehicle, leaving the cables slack enough to permit proper positioning and easy assembly of the parts. When the installation is complete, the nut 66 is loosened to permit the springs 52 and 61 to unwind partially, rotating the pulleys 47 and 56 in opposite directions. The relative rotation between pulley 47 and pulley 40 will tighten the cables 36a and 36b, and the relative rotation between the pulleys 56 and 40 will tighten the cables 38a and 38b. After both cables have been tightened by means of this single operation the nut 66 is again tightened to lock the pulleys together. When the windshield wiper drive apparatus is operated the cables will move only in the direction of their length and there will be no bodily movement of said cables in directions transverse of their length as there would be if rocker arms were provided in place of the pulleys on the drive shaft. If, after a period of use, the cables become slack for any reason, it is only necessary to loosen the nut 66 and both cables will automatically be tightened as the springs 52 and 61 unwind further.

Figure 7 shows a modified form of the invention. In this form a primary drive shaft 131 is connected directly to the wiper motor 25, shaft 131 being threaded adjacent both its ends. A first pulley 140 is splined to the shaft 131 intermediate the ends thereof, pulley 140 having an outer peripheral groove 140a which carries one cable of one pair, as the cable 36b, and an inner peripheral groove 140b which carries one cable of the other pair, as the cable 38a. A second pulley 147 is rotatably mounted on the shaft 131 adjacent one face of the pulley 140, pulleys 140 and 147 having complementary recesses in their adjacent faces. A peripheral groove 147a in the pulley 147 carries cable 38b, the end of the cable being secured to the pulley in the manner described above in connection with Figs. 4–6. A spiral spring 152 is positioned in the chamber formed by these recesses, one end of the spring being secured to pulley 140 and the other end being secured to pulley 147.

A third pulley 156 is rotatably mounted on the shaft 131 adjacent the other face of the pulley 140. A peripheral groove 156a in pulley 156 carries cable 36a, and the adjacent faces of pulleys 140 and 156 are provided with complementary recesses forming a chamber which carries a spiral spring 161, one end of the spring being connected to pulley 140 and the other end being connected to pulley 156.

The second and third pulleys 147 and 156 may be rotated with respect to the first pulley 140 to wind the springs and shorten the cables. Nuts 170 and 171 are threaded on the shaft adjacent opposite sides of the pulley assembly, and lock washers 172 and 173 are associated respectively with said nuts. After the apparatus is installed with the cables slack, one of the nuts may be loosened to permit the springs to unwind partially to tighten the cables, after which the loose nut may again be tightened to lock the pulleys together. Preferably, the adjacent faces of the respective pulleys are provided with complementary serrated areas to prevent relative rotation between the pulleys when they are locked together.

While I have shown and described one embodiment of my invention, it is subject to many modifications. Changes, therefore, in the construction and arrangement may be made without departing from the spirit and scope of the invention as set forth in the appended claims.

What is claimed is:

1. In windshield wiper drive apparatus having drive means with a primary drive shaft, output shafts for operating wipers on opposite sides of said drive means, and flexible cable means extending between said shafts, operating means including: a first pulley mounted on said drive shaft and connected to said cable means; a second pulley mounted on said drive shaft and connected to said cable means; a third pulley mounted on said drive shaft and connected to said cable means, at least one of said pulleys being rotatable on said drive shaft; spring means for rotating at least one of said pulleys relative to the other to tighten said cable means; and readily releasable means for locking all said pulleys fixedly to said drive shaft.

2. In windshield wiper drive apparatus having drive means with a primary drive shaft, output shafts for operating wipers on opposite sides of said drive means, and flexible cable means extending between said shafts, operating means including: a first pulley fixedly mounted on said drive shaft and connected to said cable means; a second pulley rotatably mounted on said drive shaft adjacent said first pulley and connected to said cable means; a third pulley rotatably mounted on said drive shaft and connected to said cable means, spring means interconnecting said pulleys for causing rotation therebetween to tighten said cable means; and readily releasable means for locking said second and third pulleys to said first pulley.

3. Apparatus of the character claimed in claim 2, wherein said pulleys have complementary serrated areas adapted to engage to lock said pulleys together, and wherein said locking means comprises a pressure member on said drive shaft to hold said members in abutting relation with the complementary serrated areas engaged.

4. Apparatus of the character claimed in claim 2, wherein said second and third pulleys are each provided with a recess forming a chamber, and wherein said spring means comprises a spiral spring positioned in each chamber.

5. In windshield wiper drive apparatus having drive means with a primary drive shaft, first and second output shafts for operating wipers on opposite sides of said drive means, and flexible cable means extending between said drive shaft and said first and second output shafts, operating means including: a first pulley mounted on said drive shaft connected to the cable means extending to said first output shaft; a second pulley mounted on said drive shaft and connected to the cable means extending to said second output shaft; and a third pulley mounted on said drive shaft and connected to cable means extending to both said first and second output shafts.

6. In windshield wiper drive apparatus having drive means with a primary drive shaft, first and second output shafts for operating wipers on opposite sides of said drive means, and flexible cable means extending between said drive shaft and said first and second output shafts, operating means including: a first pulley mounted on said drive shaft and connected to the cable means extending to said first output shaft; a second pulley mounted on said drive shaft and connected to the cable means extending to said second output shaft, at least one of said pulleys being rotatable on said drive shaft; a third pulley mounted on said drive shaft and connected to cable means extending to both said first and second output shafts; spring means for rotating at least one of said pulleys relative to the other to tighten said cable means; and readily releasable means for locking both said pulleys fixedly to said drive shaft.

7. In windshield wiper drive apparatus having a motor with a primary drive shaft, first and second output shafts for operating wipers on opposite sides of said motor, and first and second pairs of flexible cables extending between said drive shaft and said respective first and second output shafts, operating means including: a first pulley fixedly mounted on said drive shaft and connected to one cable of both said pairs; a second pulley rotatably mounted on said drive shaft and connected to the other cable of said first pair; a third pulley rotatably mounted on said drive shaft and connected to the other cable of said second pair; spring means connected between said first and second and first and third pulleys for causing rotation therebetween to tighten said cables; and readily releasable means for locking said pulleys together.

8. Apparatus, of the character claimed in claim 7 wherein said pulleys have complementary serrated areas adapted to engage to lock said pulleys together, and wherein said second and third pulleys are provided with recesses forming chambers, said spring means comprising spiral springs positioned in said respective chambers.

9. In windshield wiper drive apparatus having drive means with a primary drive shaft, first and second output shafts for operating wipers on opposite sides of said drive means, and first and second pairs of flexible cables extending between said drive shaft and said respective first and second output shafts, operating means including: a first pulley fixedly mounted on said drive shaft and connected to one cable of both of said pairs, said pulley having an elongated hub; a second pulley rotatably mounted on said hub and connected to the other cable of said first pair; a third pulley rotatably mounted on said hub and connected to the other cable of said second pair; spring means connected between said first and second and first and third pulleys for causing rotation therebetween to tighten said cables; and readily releasable means for locking said pulleys together.

10. In windshield wiper drive apparatus having a motor with a primary drive shaft, first and second output shafts for operating wipers on opposite sides of said motor, and first and second pairs of flexible cables extending between said drive shaft and said respective first and second output shafts, operating means including: a first pulley fixedly mounted on said drive shaft and connected to one cable of both of said pairs; a second pulley rotatably mounted on said shaft adjacent one face of said first pulley, said second pulley being connected to the other cable of said first pair and said first and second pulleys having complementary recesses in their adjacent faces; a spiral spring in said recesses interconnecting said pulleys for causing rotation therebetween to tighten said first pair of cables; a third pulley rotatably mounted on said shaft adjacent the other face of said first pulley, said third pulley being connected to the other cable of said second pair and said first and third pulleys having complementary recesses in their adjacent faces; a spiral spring in said last mentioned recesses interconnecting said first and third pulleys for causing rotation therebetween to tighten said second pair of cables; and readily releasable means for locking said pulleys together.

11. In windshield wiper drive apparatus having drive means with a primary drive shaft, output shafts for operating wipers on opposite sides of the drive means, and flexible cable means extending between said shafts, operating means including: a first pulley mounted on said drive shaft and rotatable therewith and connected to said cable means; a second pulley rotatably mounted on said drive shaft adjacent said first pulley and connected to said cable means; a third pulley rotatably mounted on said drive shaft and connected to said cable means, at least one of said pulleys having a recess forming a chamber with an opening facing the adjacent pulley; spiral spring means positioned in said chambers and interconnecting said pulleys for causing rotation therebetween to tighten said cable means; and readily releasable means for locking said second and third pulleys against relative rotation with respect to said first pulley.

CLARENCE P. McCLELLAND.

REFERENCES CITED

The following references are of record in the file of this patent:

UNITED STATES PATENTS

| Number | Name | Date |
| --- | --- | --- |
| 2,097,928 | Konig | Nov. 2, 1937 |
| 2,547,285 | Rappl | Apr. 3, 1951 |
| 2,574,504 | Sivacek | Nov. 13, 1951 |